March 2, 1943.  J. S. GOODMAN  2,312,542
OPTICAL INSTRUMENT
Filed March 28, 1940
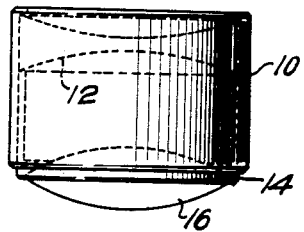
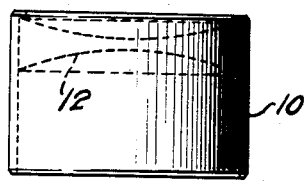
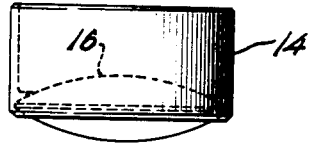
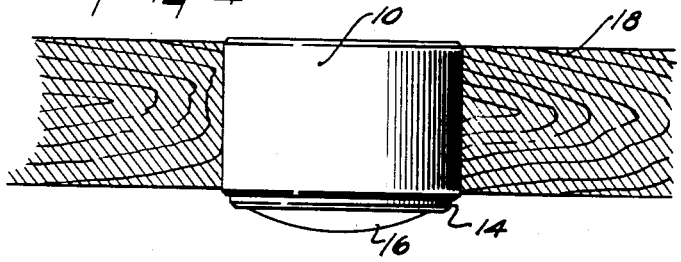
INVENTOR.
Joseph S. Goodman
BY Braun & Jones
ATTORNEYS Patented Mar. 2, 1943

2,312,542

UNITED STATES PATENT OFFICE 2,312,542

OPTICAL INSTRUMENT

Joseph S. Goodman, Albany, N. Y.

Application March 28, 1940, Serial No. 326,303

1 Claim. (Cl. 88—1)

This invention relates to peep-hole devices, and more specifically to peep-hole devices for doors.

In general it is an object of the invention to provide a device of the character described which will efficiently perform the purposes for which it is intended, which is simple and economical of construction, which can be expeditiously, conveniently manipulated, and which can be readily manufactured and assembled.

Another object of the invention is to provide a peep-hole lens combination which permits an observer on one side of a thin door to have a clear view of whatever is present throughout a large range of vision on the other side of the door, and to provide such a combination which is of relatively small dimensions perpendicular to its optical axis.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claim.

For a fuller understanding of the nature and objects of the invention reference should be had to the following detailed description taken in connection with the accompanying drawing, in which:

Figure 1 is a view of a device as a complete unit embodying one form of the invention;

Figs. 2 and 3 are views of parts of the device shown in Fig. 1; and

Fig. 4 is a cross section of the device in a door.

It is desirable that a lens system for a peep-hole in a door should not have an over-all length greater than the thickness of the door in which it is to be used. Modern doors or their panels are as a rule not thicker than three-quarters of an inch, and they are often only five-sixteenths of an inch thick.

This invention contemplates a peep-hole lens system which may be positioned in such a door without extending beyond the surfaces thereof and which at the same time is useful in that it permits one to see through it in one direction with clear vision over a large field of view and does not permit one to see through it in the other, and in that it is inconspicuous and soundless.

In the drawing, 10 denotes a cylindrical casing in which is permanently fixed a negative, double-concave lens 12 having an optical axis co-linear with the casing axis. A second cylindrical casing 14 is slidable into casing 10 and has fixed therein a positive, double-convex lens 16 with its optical axis co-linear with the casing axis. The assembled casings may be positioned in a passageway through a wall 18, as shown in Fig. 4, with the negative lens toward the outside of the door.

For door panels of about five-sixteenths of an inch and lower to about nine-sixteenths of an inch in thickness, the lens 12 may be 9 mm. in diameter, with 12.76 mm. focal length, 80.0 D minus power, and 1.523 refractive index, and the lens 16 may be of the same diameter and refractive index, with focal length of 25.07 mm. and 40.0 D plus power. The distance between the vertices of the surfaces of the lenses adjacent each other may be 12.31 mm.

For door panels of from about nine-sixteenths to about three-quarters of an inch in thickness, the lens may be of the diameter and refractive index specified above. The lens 12 may have a power of 60.0 D minus and a focal length of 16.99 mm., and the lens 16 may have a focal length of 33.55 mm. and a power of 30.0 D plus. The separation between the vertices of the surfaces of the lenses adjacent each other may be 16.55 mm.

For the lenses described above, a thickness of about a millimeter, measured parallel to the lens axis, at the periphery, is satisfactory in the case of the positive lens. The negative lens may have a fifty percent greater thickness, similarly measured.

The device described above may be used in very thin wall or door paneling. A person on the outside may be readily and clearly observed while he is unaware that he is being watched.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all the generic and specific features of the invention herein described, and all statements of the scope of the invention which as a matter of language might be said to fall therebetween.

Having described my invention, what I claim as new and desire to secure by Letters Patent is:

A short optical instrument for spying purposes comprising a double convex lens having a focal length of from about 25 mm. to about 34 mm. and a double concave lens having a focal length of from about 13 mm. to about 17 mm., the optical axes of said lenses being co-linear, the optical power of said concave lens being about double the optical power of said convex lens, and said lenses having about the same diameter, the distance between the vertices of the surfaces of said lenses facing each other being from about 12 mm. to about 17 mm.

JOSEPH S. GOODMAN.